United States Patent [19]
Mills et al.

[11] 3,959,435
[45] May 25, 1976

[54] PROCESSING OF IRRADIATED NUCLEAR REACTOR FUEL

[75] Inventors: Alfred Leonard Mills; Ernest Lillyman; Peter Gordon Bell, all of Thurso, Scotland

[73] Assignee: United Kingdom Atomic Energy Authority, London, England

[22] Filed: May 24, 1973

[21] Appl. No.: 363,551

Related U.S. Application Data

[63] Continuation of Ser. No. 160,119, July 6, 1971, abandoned.

[30] Foreign Application Priority Data
July 7, 1970 United Kingdom............... 33028/76

[52] U.S. Cl............................. 423/10; 252/301.1 R
[51] Int. Cl.²......................................... B01D 11/04
[58] Field of Search................. 423/10; 252/301.1 R

[56] References Cited
UNITED STATES PATENTS
2,924,506   2/1960   Anderson et al. .................... 423/10

FOREIGN PATENTS OR APPLICATIONS
576,900   2/1959   Canada................................ 423/10
983,380   2/1965   United Kingdom................... 423/10
801,743   9/1958   United Kingdom................... 423/10

OTHER PUBLICATIONS

Flagg, J. (Ed.), Chem. Processing of Rea. Fuels, pp. 207–210, 1961.

Primary Examiner—Leland A. Sebastian
Assistant Examiner—R. E. Schafer
Attorney, Agent, or Firm—Larson, Taylor and Hinds

[57] ABSTRACT

A process for the treatment of irradiated fissile material in solution in nitric acid in which tributylphosphate diluted to less than 7% by volume with an inert diluent is contacted with the nitric acid solution and backwashed with sulphuric acid.

1 Claim, No Drawings

PROCESSING OF IRRADIATED NUCLEAR REACTOR FUEL

BACKGROUND OF THE INVENTION

This is a continuation of application Ser. No. 160,119, filed July 6, 1971, now abandoned.

This invention relates to the processing of irradiated nuclear reactor fuel.

The processing of irradiated nuclear fuel generally involves the separation of fissile material from fission products and also the separation of uranium from plutonium. Liquid extraction is the widely accepted method of carrying out both separation processes and for the separation of fissile material from fission products the solvent is usually tri n-butyl phosphate diluted with an inert solvent which may comprise carbon tetrachloride or one or more straight chain paraffins, for example, n-dodecano. Tributyl phosphate is also used similarly for the separation of uranium and plutonium. The effect of the diluent is to adjust the density of the organic phase in the solvent extraction process. It may also affect the viscosity of the organic phase and the efficiency of the extraction. Commonly the concentration of the tributyl phosphate in the organic phase has been in the region of 20% by volume and there has been a tendency in recent years to increase the concentration (up to about 30%).

SUMMARY OF THE INVENTION

According to the present invention in the process for the treatment of irradiated nuclear fuel in which fissile material in solution in nitric acid is contacted with tributyl phosphate diluted with an inert organic diluent to transfer the fissile material to the organic phase and the organic phase is separated from the aqueous phase and backwashed with aqueous sulphuric acid, the concentration of the tributyl phosphate in the inert diluent is less than 7 volume per cent.

The effect of lowering the tributyl phosphate concentration in this way is to decrease the density of the organic phase and reduce its viscosity. These changes in density and viscosity case the separation of the organic and aqueous phases after contacting, allow more organic liquor to be fed through a given plant and hence the processing of more fuel. It has been found also that a higher decontamination factor is achieved with respect to the major ctive fission products found in irradiated nuclear fuel.

The full advantages are only obtained if aqueous sulphuric acid is used for backwashing the organic phase after contacting with the diluted tributyl phosphate. Using the conventional very weak nitric acid backwash gives rise to large volumes of liquid which are difficult to handle in subsequent extraction cycles and may reduce the decontamination factors achieved.

DETAILED DESCRIPTION

The actual lower tributylphosphate concentration selected will depend upon the process and the plant used, and the nature of the irradiated nuclear fuel. The size of the plant, the throughput required and the uranium concentration in the food are taken into consideration in order to get a suitable solvent/aqueous ratio for good mechanical and chemical operation of the plant. 6% tributyl-phosphate (TBP) has been used to process satisfactorily both uranium-plutonium materials (with a metal concentration in the aqueous feed of 200 g/l and Dounreay Fast Reactor fuel (U only, 125 g/l). The following figures illustrating the invention indicate the decontamination factors obtained overall in a plant operating with 6% and 20% TBP.

|       | 6% TBP              | 20% TBP           |
|-------|---------------------|-------------------|
| β     | $5 \times 10^7$     | $5.6 \times 10^5$ |
| γ     | $7 \times 10^7$ about | $7 \times 10^6$  |
| Ru    | $4.4 \times 10^7$   | $2.7 \times 10^7$ |
| Zr/Nb | $6.3 \times 10^7$   | $3.5 \times 10^6$ |

When processing Dounreay Fast Reactor fuel with 20% TBP in reprocessing plant which consisted of a series of geometrically safe mixer settlers arranged in cascade the mixer-settlers tended to become unstable during long campaigns on account of niobium-bearing solids and it was sometimes necessary to stop the processing in order to clean out the first cycle extractor and restore interface stability. Pilot plant tests showed that with 6% TBP the differences in the physical properties between the aqueous and solvent phases eliminated all traces of interface stability and also that the "textbook" wedge of mixed phase at the liquid/liquid interface of a gravity settler had disappeared giving no trace of interfacial cruds.

If nitric acid was used for backwashing the uranium, the volume of first cycle product was too large for the rest of the plant operating on 25% TBP. The use of dilute sulphuric acid for backwashing gave an acceptably low volume for the first cycle product. Sufficient nutric acid is backwashed to prevent undue plant corrosion. After intercycle acidity adjustment with nitric acid a second cycle using 25% TBP/OK followed by sulphuric acid backwash and a third cycle of 25% TBP/OK with a nitric acid backwash was used.

Pilot plant experiments showed that a true solvent utilisation (uranium plus nitric acid) of about 100% was being obtained in the first cycle (6% TBP/OK) feed plate region. It is to be noted that in the dilute TBP systems the uranium content of the solvent can be varied by adjusting the solvent/aqueous ratio in the system, the balance of the solvent utilisation being acid. It is possible to eliminate almost all the acid content of the solvent phase by "squeezing" the flowsheet, i.e. by using extreme solvent/aqueous ratios. Full scale plant runs using active feeds gave high fision product decontamination factors. Table II lists typical decontamination factors for the Fast Reactor fuel reprocessing using different TBP concentrations. As forecast from pilot plant experiments the interface stability was excellent in the plant and there has been no suggestion of blockages during plant operation.

Use of low TBP concentrations also has the added advantage that the residence time per mole of TBP per pass is reduced. As a consequence of this the radition dose per pass to the TBP is reduced. The reduced formation of Hydrogen-dibutyl-phosphate (HDBP) is likely to enhance decontamination factors.

TABLE II

Decontamination factors for Fast Reactor Fuel Reprocessing using various TBP Concentrations

| Run | | + 6%** | | C.I. 25%** | C.I. 30%** | Best 20%** | |
|---|---|---|---|---|---|---|---|
| | | Run D.F. | Daily Average | x | x | x | |
| First cyclo | $\beta$ | $2.6 \times 10^4$ | $2.8 \times 10^4$ | $4.2 \times 10^3$ | | $6.2 \times 10^3$ | AR.12 |
| extraction | $\gamma$ | $6.4 \times 10^3$ | $2.5 \times 10^3$ | $6.0 \times 10^2$ | | $8.6 \times 10^2$ | AR.12 |
| and strip | Ru | | $1.6 \times 10^4$ | $7.5 \times 10^2$ | | $1.7 \times 10^3$ | AR.13 |
| only | Zr/Nb | | $1.3 \times 10^4$ | $8.8 \times 10^2$ | | $6.4 \times 10^2$ | AR.12 |
| First cycle | $\beta$ | | $2.1 \times 10^4$ | $6.9 \times 10^3$ | $2.1 \times 10^2$ | $1.3 \times 10^4$ | AR.12 |
| | $\gamma$ | | $1.0 \times 10^4$ | $2.3 \times 10^3$ | $0.6 \times 10^2$ | $2.5 \times 10^3$ | AR.12 |
| | Ru | | $2.6 \times 10^4$ | $3.0 \times 10^3$ | | $5.3 \times 10^3$ | AR.9 |
| | Zr/Nb | | $9.8 \times 10^3$ | $1.4 \times 10^4$ | $0.9 \times 10^2$ | $1.9 \times 10^3$ | AR.9 |
| Overall for | $\beta$ | $1.5 \times 10^{7*}$ | $3.3 \times 10^{7*}$ | $1.2 \times 10^{6\gamma}$ | $1.5 \times 10^5$ | $5.6 \times 10^5$ | AR.11x |
| 3 cycles | $\gamma$ | $7 \times 10^{7*}$ | $\sim 5.5 \times 10^{5\emptyset}$ | $\sim 1.1 \times 10^7$ | $2.7 \times 10^6$ | $\sim 7 \times 10^6$ | AR.11 |
| | Ru | $>4.4 \times 10^7$ | $>5.9 \times 10^7$ | | $2.6 \times 10^6$ | $2.7 \times 10^7$ | AR.9 |
| | Zr/Nb | $6.3 \times 10^7$ | $9.0 \times 10^7$ | $2.9 \times 10^7$ | $3.2 \times 10^6$ | $3.5 \times 10^6$ | AR.9 |

Active food, U irradiated to ca 22,000 MWD/to, average cooling period ca 90 days NOTES:
+ — Large amount U-237 present
× — No U-237 present
$\gamma$ — No allowance for U-237
\* — Correction made for U-237
\*\* 6% = 6% TBP cycle I 25% TBP cycles II and III
\*\* 25% = 25% TBP throughout
\*\* 30% = 30% TBP cycle I, 20% TBP cycles II and III
\*\* 20% = 20% TBP throughout

We claim:

1. In the process for the treatment of irradiated nuclear fuel in which fissionable material in solution in nitric acid is contacted with tributyl phosphate diluted with an inert organic diluent to transfer the fissionable material to the organic phase and the organic phase is separated from the aqueous phase and backwashed with an aqueous sulphuric acid solution the improvement wherein the concentration of the tributyl phosphate in the inert diluent is less than 7 volume percent and in subsequent steps the aqueous phase obtained after backwashing of the organic phase with sulphuric acid is conditioned with nutric acid, contacted with tributyl phosphate diluted with an inert organic diluent to a concentration not less than 20 volume percent and the resulting organic phase backwashed with dilute acid.

* * * * *